July 17, 1951  O. BROOKS  2,561,046
FISHING ROD HOLDER
Filed Dec. 31, 1948
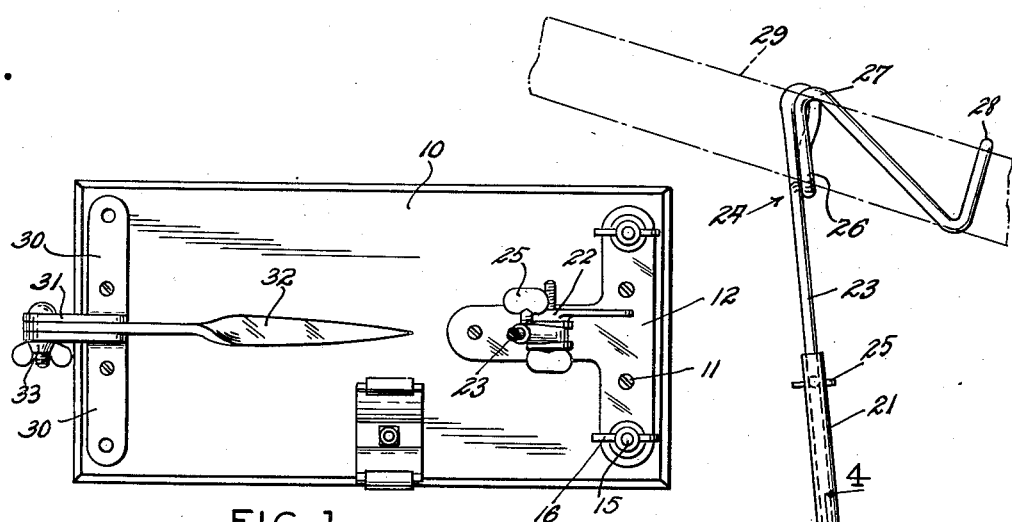
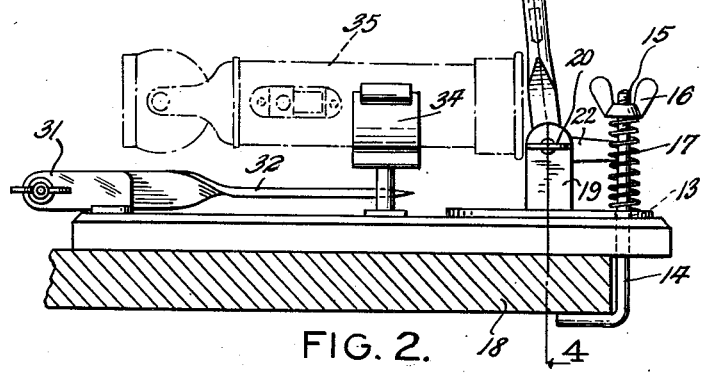
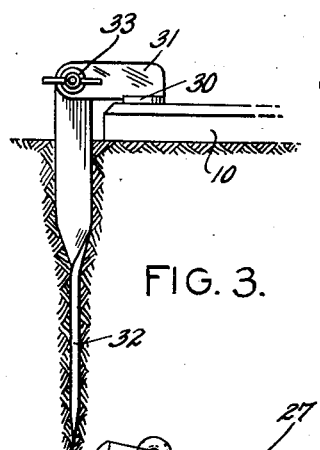
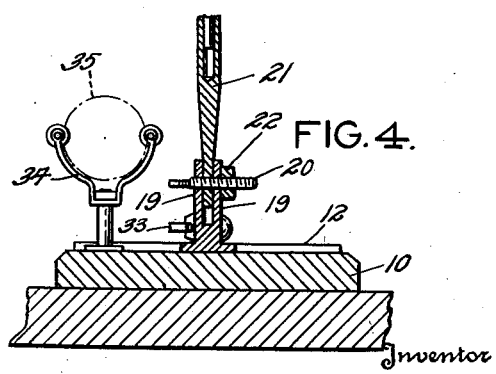
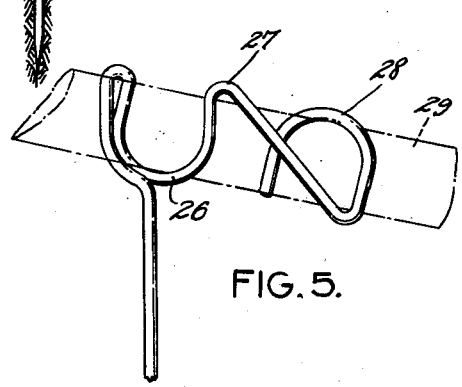
FIG. 1.
FIG. 2.
FIG. 3.
FIG. 4.
FIG. 5.
Inventor
Oakley Brooks
By W. S. McDowell
Attorney Patented July 17, 1951

2,561,046

UNITED STATES PATENT OFFICE 2,561,046

FISHING ROD HOLDER

Oakley Brooks, Columbus, Ohio

Application December 31, 1948, Serial No. 68,506

1 Claim. (Cl. 248—42)

The present invention relates to apparatus for holding or anchoring fishing rods, poles or the like in a fixed position relative to a boat or a bank adjoining a body of water.

The primary object of this invention is to provide a mechanically efficient yet structurally simple fishing rod holder which may be quickly and easily detachably secured to a relatively stationary object, such as the thwarts or gunwales of a boat, or securely anchored to the ground when fishing from the bank of a stream, and which is characterized by its flexibility of adjustment so as to securely hold a fishing rod or pole in any desired angle with respect to a boat or the bank of a stream.

It is another object of this invention to provide a device for anchoring a fishing rod which, when not in operative use, may be folded into a compact and relatively small device which may easily be carried within the ordinary fishing tackle box.

It is still a further object of this invention to provide a fishing rod holder which is provided with dual means for securing the holder to stationary members of a boat and also to secure the holder in a firmly anchored position with respect to the ground.

These and additional objects and advantages will become readily apparent by reference to the following description and the accompanying drawing wherein:

Fig. 1 is a sectional top plan view of the present fishing rod holder;

Fig. 2 is a side elevational view disclosing the present fishing rod holder operatively installed upon the thwart of a boat;

Fig. 3 is a side elevational view of the foldable ground-piercing member for securing the holder to the ground;

Fig. 4 is a transverse vertical sectional view taken along the line 4—4 of Fig. 2;

Fig. 5 is a detail perspective view of the rod-receiving member of the present fishing rod holder.

Referring now to the drawing, it will be seen that the present fishing rod holder makes use of a relatively flat rectangular base 10, preferably formed from wood, and having secured thereto at one end, as by means of screws 11, a T-shaped metallic strap 12. The strap 12 is formed with a pair of transverse spaced openings 13 which register with complemental openings extending through the base 10, and through which extend a pair of L-shaped hook devices 14. The hook devices 14 are screw-threaded at their upper ends as at 15, to receive cooperatively threaded wing nuts 16, and interposed between each of the wing nuts 16 and the upper surface of the strap 12 is a coil compression spring 17 which functions to raise the wing nuts and the hook devices to maintain the lower ends thereof in abutting relation to the bottom surface of the base 10. To extend the hooked end portions of the device 14, the wing nuts are pressed downwardly against the action of the spring 17, to permit the hooks to overlap the under surface of a thwart 18 or other stationary member of a boat or dock. Upon release of manually executed pressure upon the hook devices, the compression springs 17 serve to exert clamping force upon the thwart to firmly hold the base 10 thereon. The T-shaped strap 12 is provided at its central region with a pair of upstanding relatively spaced ears 19 between which extends a screw-threaded thumb screw 20 upon which is pivotally mounted the lower end of a tubular post or standard 21. The outer end of the thumb screw 20 is in threaded engagement with a cooperatively threaded nut 22, and by tightening the connection between the thumb screw and the nut 22, the lower end portion of the post 21 may be rigidly clamped between the ears 19 to prevent swinging movement thereof. The pivotal connection provided by the thumb screw provides for the swinging movement of the post 21 between substantially folded parallel and outwardly extending perpendicular positions with respect to the flat base 10, and the post 21 may be locked in any position therebetween by tightening the thumb screw 20.

Slidably and rotatably carried within the opposite end of the tubular post 21 is the straight cylindrical shank portion 23 of a rod-receiving frame, generally indicated by the numeral 24. Extending through the wall of the post member 21, substantially at the upper end thereof is a screw-threaded thumb screw 25 which may be tightened inwardly of the post to bind the shank portion 23 of the frame therein, and thereby prevent rotation or sliding movement of the frame with respect to the post. The frame 24 is preferably formed of integral one-piece construction, and is bent at its intermediate portion to provide an outwardly opening U-shaped bail or socket-forming portion 26 which lies substantially in the plane of the shank portion 23. The outer end portion of the frame 24 is bent backwardly in acutely angular relation to the shank portion 23, as at 27, and into a half loop at its extreme outer end to provide a second U-shaped bail or socket portion 28 which opens opposite to the first bail portion 26. The two bail portions 26 and 28 provide a socket frame into which the handle portion of a rod or fishing pole may be inserted, with the longer end portion of the rod extending outwardly away from the first bail member 26, whereby the weight of the rod or pole will tend to swing the same in a generally counter-clockwise direction, as viewed from Figs. 2 and 5, which motion is prevented by the bail member 28. By the same token, the weight of a fish striking upon the line attached to the rod or pole will only tend to force the handle portion into tighter engagement with the downwardly opening bail portion 28, and will thereby preclude any accidental detachment of the pole from the frame 24.

It will be manifest that the thumb screws 20 and 21 provide for adjustment of the handle-receiving frame 24 relative to the base 10 in both vertical and rotational planes, and the frame member may be elevated or depressed by sliding movement within the associated standard or post 21. In this manner, the position of a rod or pole 29 carried by the frame 24 may be controlled to meet the desires of the user.

For purposes of anchoring the holder during bank-fishing operations, the base 10 is provided at its opposite end with a pair of relatively spaced metallic straps 30 which are formed with upwardly and outwardly extending ears 31 between which is pivotally carried a relatively elongated and half-twisted piercing member 32. The pivotal connection between the ears 31 and the piercing member 32 is accomplished by means of a screw-threaded bolt and cooperative wing nut assembly 33 by which the piercing member may be firmly clamped between the ears in any position between a parallel folded position with respect to the base, as shown in Fig. 1, and a downwardly extending perpendicular position with respect thereto as shown in Fig. 3. This latter position provides for complete insertion of the piercing member 32 in the surface of the ground, and after such insertion, by tightening the wing nut assembly 33, the base 10 is prevented from movement with respect to the ground.

Advantageously, the base 10 may be provided with an upstanding resiliently expansible spring socket 34 for the clamping reception of an ordinary flashlight 35 which may advantageously be used during night fishing to ascertain the position of the rod or pole, and its associated fishing line, not shown, with respect to the body of water. The spring clamp 34 further provides a convenient holder for the flashlight when not in use, or for other instrumentalities used by the fisherman.

In view of the foregoing, it will be seen that the present invention provides a useful and mechanically efficient device for supporting or anchoring the handle portion of a fishing rod or pole in adjustable but fixed positions with respect to a stationary object, such as a boat, or the ground.

Fishing rod holders formed in accordance with the present invention are characterized by their structural simplicity, economy of manufacture, and ease and flexibility of operation.

While a single preferred embodiment of the invention has been described in detail, it will be manifest that the same is subject to modifications with reference to constructional details without departing from the spirit of the invention or the scope of the following claim.

I claim:

A holder for fishing rods comprising a substantially flat platform base; a plurality of spring-pressed resiliently extensible hook devices depending from said base for hooking engagement with a stationary member of a boat; a tubular standard pivotally connected with said base for swinging movement between positions substantially parallel and perpendicular to said base; means engageable with said standard at its pivotal connection with said base for locking said standard in any position between said parallel and perpendicular positions; a rod-attaching member formed with a straight shank portion carried within said standard for axial rotational and longitudinal sliding movement therein, said rod-holding member being formed with a pair of relatively spaced oppositely opening socket-forming webs for the reception of the handle portion of a fishing rod; and a thumb screw carried by said standard and engageable with the shank portion of said rod-attaching member for clamping the latter within said standard to prevent rotational and sliding movement of the shank portion within said standard.

OAKLEY BROOKS.

REFERENCES CITED

The following references are of record in the file of this patent:

UNITED STATES PATENTS

| Number | Name | Date |
| --- | --- | --- |
| 840,241 | Nootbaar | Jan. 1, 1907 |
| 1,619,152 | Nunlist | Mar. 1, 1927 |
| 2,472,059 | Arwood | June 7, 1949 |

FOREIGN PATENTS

| Number | Country | Date |
| --- | --- | --- |
| 578,361 | Great Britain | Jan. 25, 1946 |